Aug. 29, 1944.  C. A. MAXWELL  2,357,123
APPARATUS FOR PRODUCING PRESSURE-TIGHT TUBE AND TUBE SEAT CONNECTIONS
Original Filed May 20, 1939   5 Sheets-Sheet 1
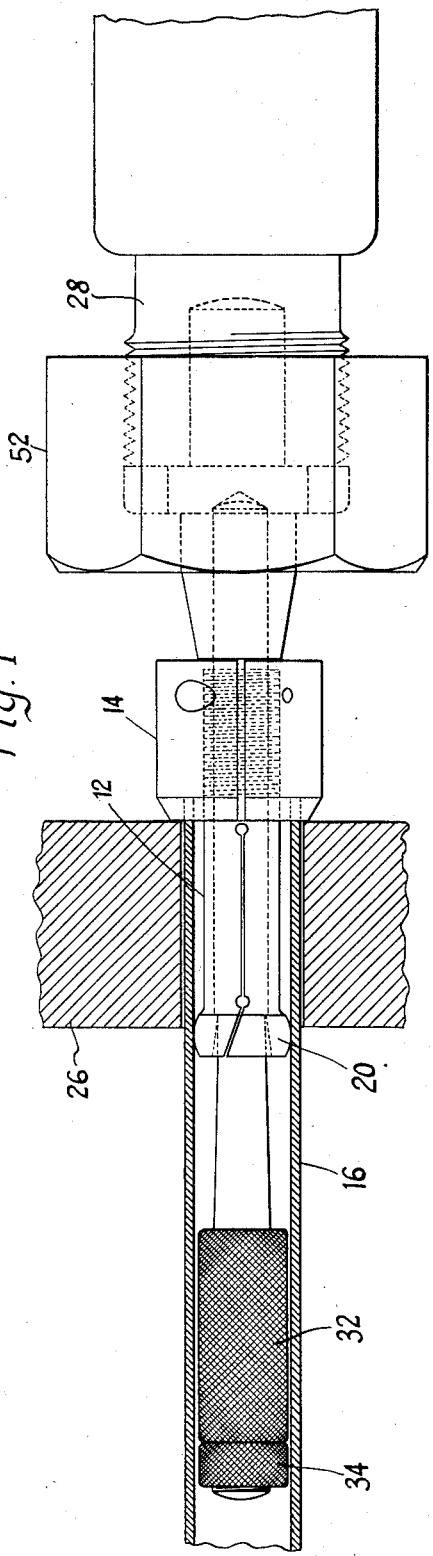
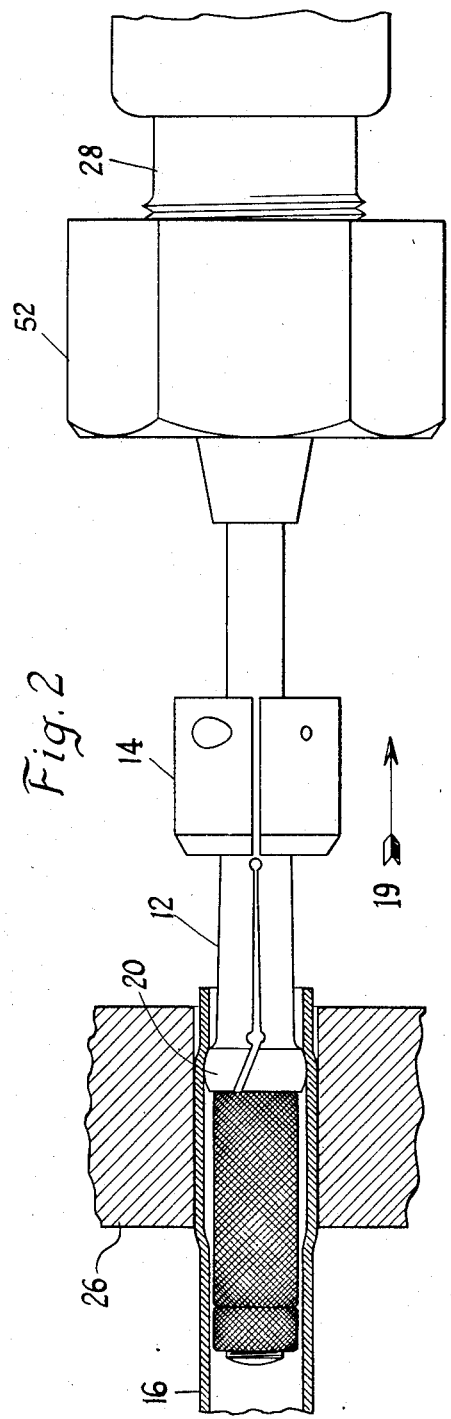
INVENTOR.
Carl A. Maxwell
BY
Attorney Aug. 29, 1944.  C. A. MAXWELL  2,357,123
APPARATUS FOR PRODUCING PRESSURE-TIGHT TUBE AND TUBE SEAT CONNECTIONS
Original Filed May 20, 1939  5 Sheets-Sheet 2
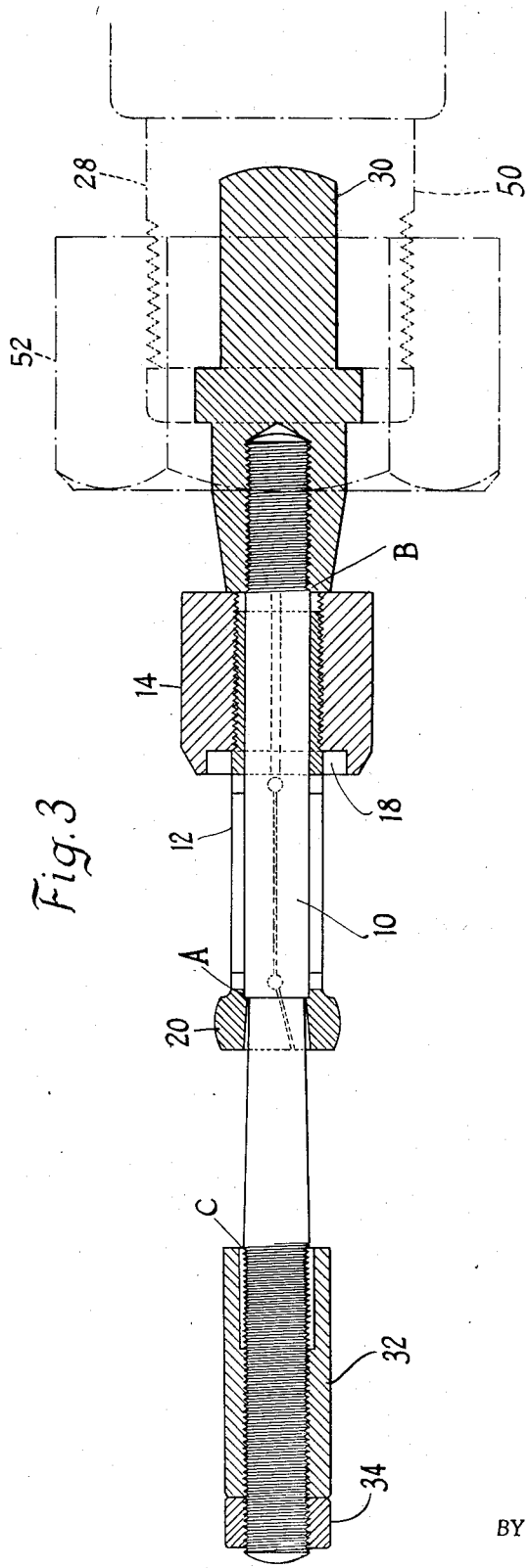
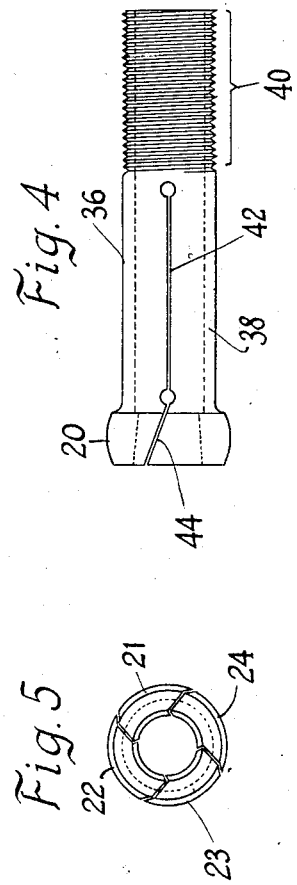
INVENTOR.
Carl A. Maxwell
BY R. W. Holbrook Attorney Aug. 29, 1944.    C. A. MAXWELL    2,357,123
APPARATUS FOR PRODUCING PRESSURE-TIGHT TUBE AND TUBE SEAT CONNECTIONS
Original Filed May 20, 1939    5 Sheets-Sheet 3
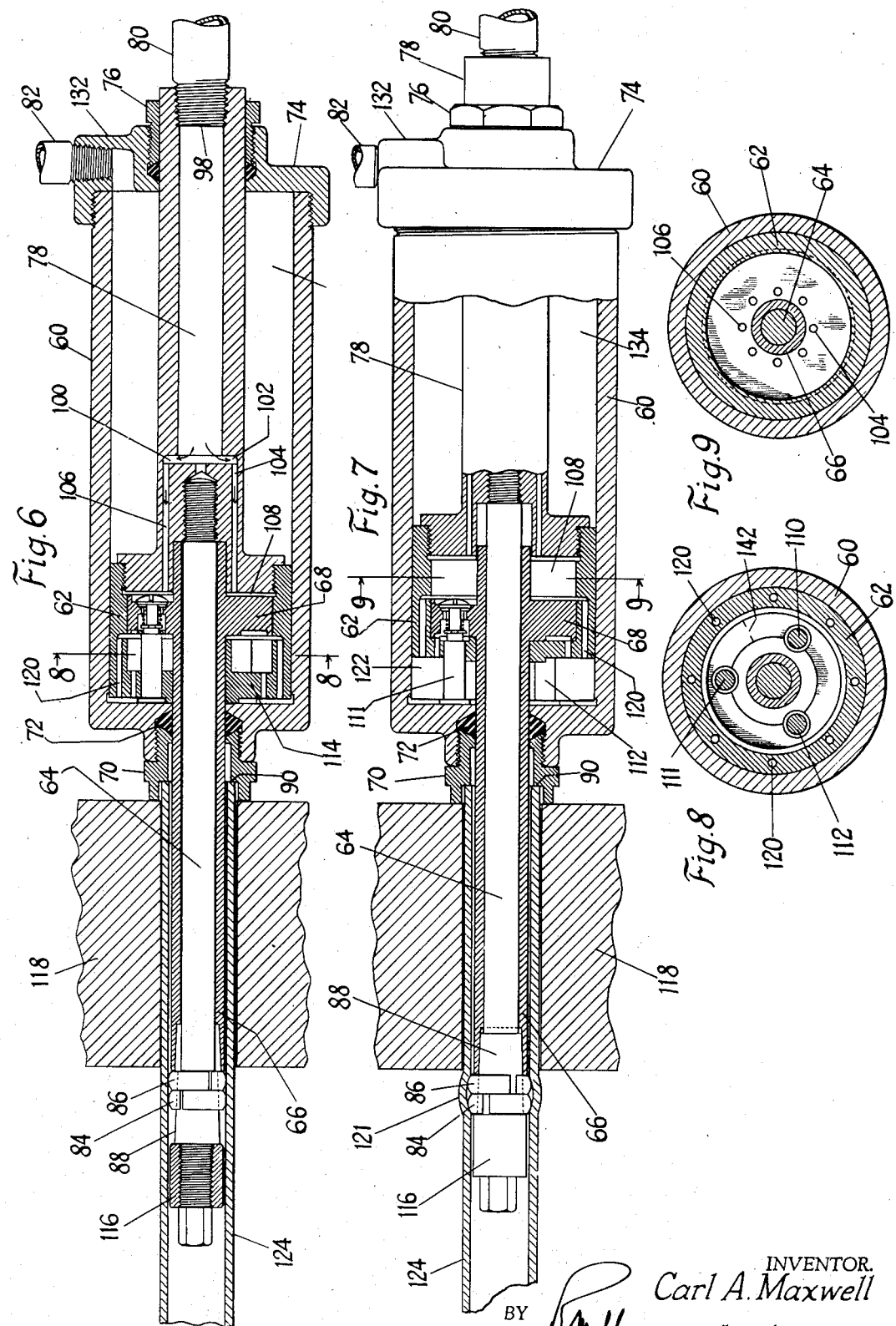
INVENTOR.
Carl A. Maxwell
BY R. M. Holbrook Attorney

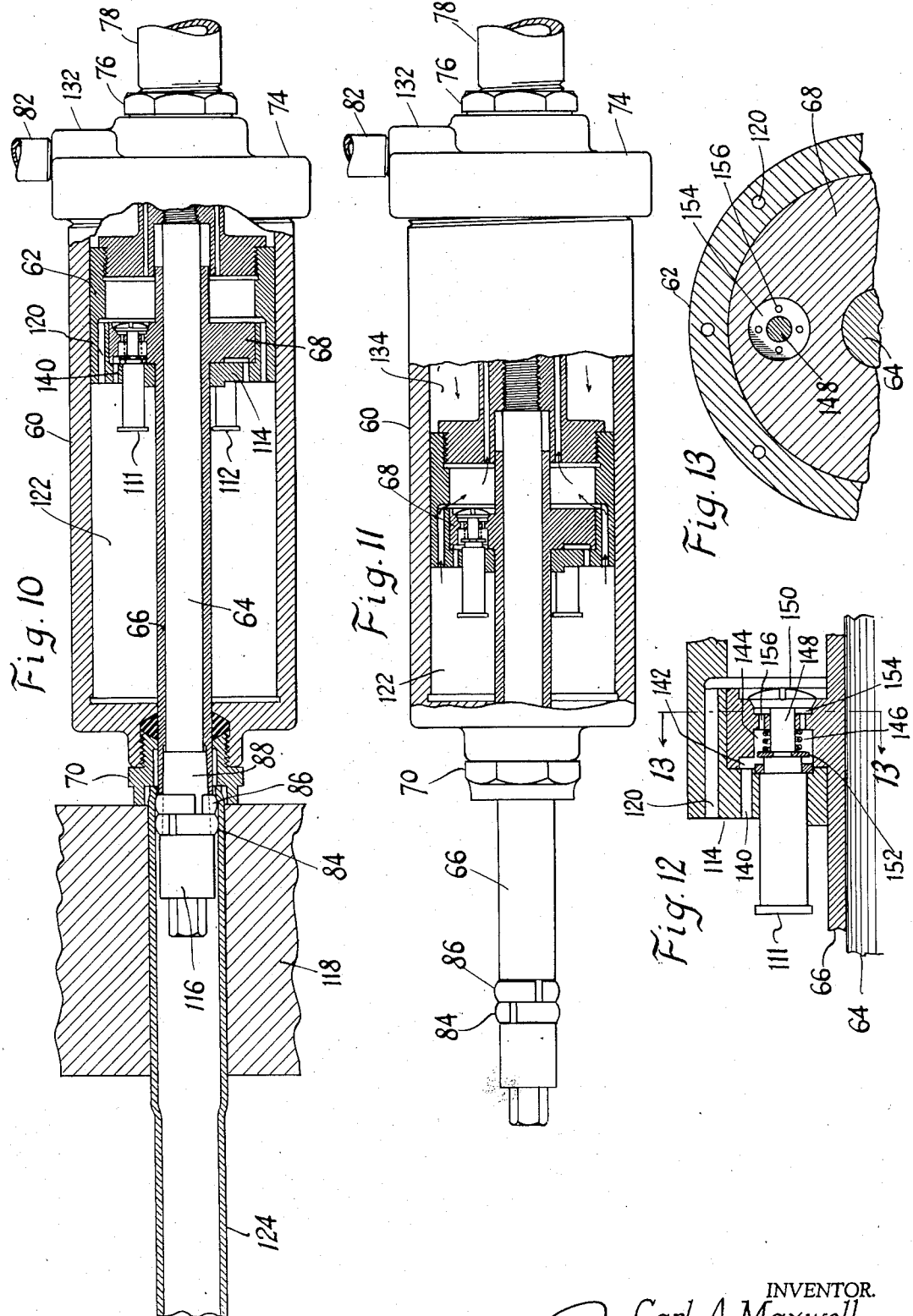

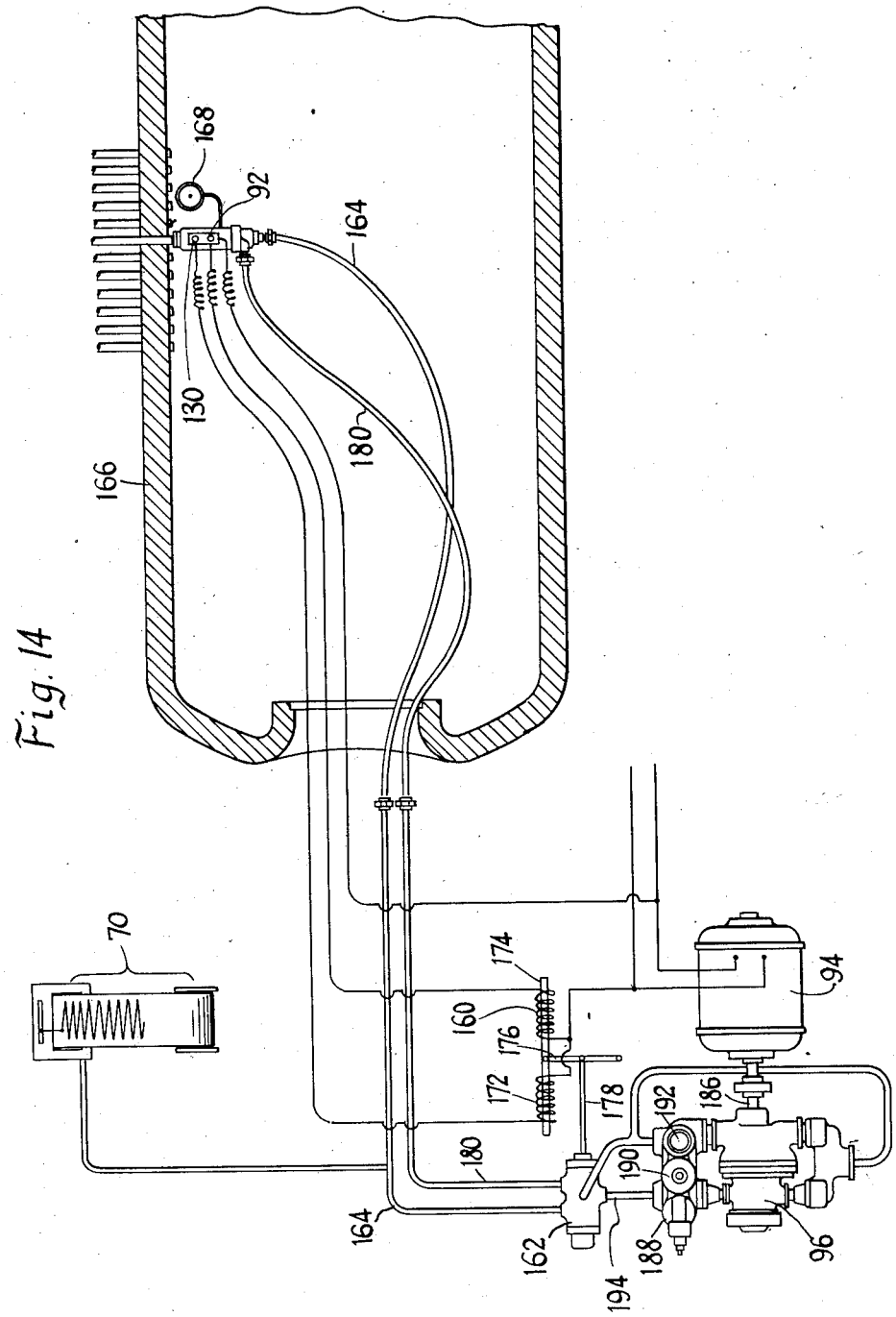

Patented Aug. 29, 1944

2,357,123

UNITED STATES PATENT OFFICE 2,357,123

APPARATUS FOR PRODUCING PRESSURE-TIGHT TUBE AND TUBE SEAT CONNECTIONS

Carl A. Maxwell, Akron, Ohio, assignor to The Babcock & Wilcox Company, Newark, N. J., a corporation of New Jersey Original Application May 20, 1939, Serial No. 274,749. Divided and this application May 23, 1941, Serial No. 394,758

6 Claims. (Cl. 153—80.5)

The improvements with which this invention is concerned relate to devices in which expanded tube seat connections are employed. The invention involves novel apparatus for carrying out a novel method of making such connections.

It is an object of the invention to produce pressure-tight tube seat connections without imposing undesirable residual stresses upon the operative parts of the tubes employed. For example, the invention may be employed to advantage in fluid heat exchange apparatus of the convection type wherein a plurality of spaced tubes are fixed to one drum wall or tube sheet at their inlet ends, and to another drum wall or tube sheet at their outlet ends. The tubes normally conduct one heat exchange fluid through another at a different temperature and the operating temperatures and pressures are often of high degree.

Among other objects of the invention is the production of a pressure-tight expanded tube seat connection in a manner which will not involve the high degree of skill involved with roller expanding.

It is also an object of the invention to provide an expanded joint which can be produced with great rapidity. This contributes materially to the reduction of the cost of any installation in which the illustrative method is employed.

The invention involves such operations that portions of a tube wall throughout the length of the tube seat are subjected to the same predetermined working and the tube stressing is confined to the tube length within the tube seat.

When the invention is employed in the manufacture of the above indicated apparatus the tubes are uniformly secured to the tube sheets, or drum walls in pressure-tight relationship, and the main portions of the tubes are not bowed by longitudinal compression stresses. Furthermore, none of the tubes in their unsupported length are put in compression by the expanding operations.

The invention will be described with reference to the accompanying drawings, in which:

Fig. 1 is a view showing the tube expander in elevation with the tube sheet and the associated tube shown in section;

Fig. 2 is a view similar to Fig. 1 showing the position of the expander while it is moving in the direction of the arrow 19, and after it has completed the expansion of a major portion of the tube within the tube seat;

Fig. 3 is a view showing most of the parts of the tube expander in section;

Fig. 4 is an elevation of the split expander sleeve;

Fig. 5 is an end elevation of the split ball expander head at the end of the sleeve shown in Fig. 4;

Fig. 6 is a longitudinal section showing a multiple ring expander associated with a hydraulic operator. This figure also illustrates the first step in the expanding method, the expander head being inserted within the tube to be expanded;

Fig. 7 is a longitudinal section of the Fig. 6 apparatus, illustrating the initial expanding of the tube by the action of the hydraulic operator upon the adjacent expanding rings;

Fig. 8 is a transverse section taken on the line 8—8 of Fig. 6, looking in the direction of the arrows;

Fig. 9 is a transverse section taken on the line 9—9 of Fig. 7, looking in the direction of the arrows;

Fig. 10 is a longitudinal section of the Fig. 6 apparatus illustrating the conditions substantially at the completion of the tube expanding operation;

Fig. 11 is a longitudinal section through the hydraulic operator illustrating the movement of fluid to effect the reverse movement of the expander head;

Fig. 12 is a detail longitudinal section of a part of the piston construction within the hydraulic operator;

Fig. 13 is a partial transverse section taken along the plane indicated by the line 13—13 of Fig. 12 and looking in the direction of the arrows; and Fig. 14 is a diagrammatic view illustrating the expander system, and the apparatus employed to simultaneously expand and draw tubes within a pressure vessel with the assurance that all of the expanded connections will be pressure-tight.

Fig. 3 of the drawings clearly shows the relationship of the parts constituting the tube expander. It includes the mandrel 10 upon which the expander sleeve 12 is slidably mounted. The annular end of the sleeve 12 is screw-threaded into a collar 14 which is preferably of greater diameter than the tube 16 into which the sleeve and the mandrel are inserted prior to the initiation of the expanding operation. This collar may be formed in two halves so as to facilitate the replacement of the sleeve 12. The collar acts as a stop to determine the depth of the expanding and it is formed at one end with a recess 18 to receive the end of the tube 16 which may project through the wall 20 initially, or as the result of the expanding action.

The intermediate portion of the mandrel 10 such as the portion AB may be of cylindrical contour and of such diameter that the sleeve 12 is freely slidable thereon, but the section AC is tapered so that it increases in diameter away from the position A. Thus, after the expander is inserted in the tube 16, as indicated in Fig. 1 of the drawings, relative transitory motion between the mandrel 10 and the split ball expander head 20 causes the segments 21—24, inclusive, of the expander head to move radially and outwardly so as to expand a portion of the tube with a metal drawing action and cause it to be fitted tightly in the tube seat, as indicated in Fig. 2 of the drawings. The external surfaces of the head segments approximate spherical surfaces so as to facilitate such action.

When a pneumatic tool, such as that indicated at 28 in Fig. 3, exerts a pull to the right on the coupling 30 (screw-threaded upon the right-hand end of the mandrel as shown) the tapered section AC of the mandrel is moved through the expander head 20 to cause this expanding action, and the degree of expanding of the tube when the extended had bears against it is determined by the position of the adjusting nut 32 upon the opposite end of the mandrel. As the mandrel is pulled to the right by the tool 28 the end surfaces of the segments of the expander head 20 abut against the right-hand end of the adjusting nut 32, and further movement of the mandrel to the right draws the expander head through the tube and expands the tube within the tube seat formed in the tube sheet 26. The adjusting nut 32 is held in a predetermined position upon the mandrel 10 by a lock nut 34. This construction permits compensation for slight variations in internal dimensions, or bore of the head 20 at its position of bearing on the tapered mandrel portion.

The expander sleeve is preferably formed of tool steel and it is hardened and drawn from the back for spring action. There are longitudinal segments such as those indicated at 36 and 38 in Fig. 4 extending from the screw-threaded annular portion 40 to the expander head segments 21—24, which are hardened and ground to size, the former segments being formed by splitting the sleeve along longitudinal lines as indicated at 42. At the left-hand ends of the spring segments 36 and 38 the expander head segments 21—24 are separated by oblique slits or cuts such as that shown at 44. Thus, the expander head segments are biased by the spring action of the segments 36 and 38, etc., inwardly to a position wherein the outside diameter of the entire expander head is less than the inside diameter of the tube 16. This permits the expander to be readily inserted within the tube as indicated in Fig. 1 of the drawings. Also, the diagonal or oblique spilts between the segments 21—24, inclusive, provides for substantially uniform expanding action throughout the entire circumference of the tube 16.

It is to be understood that the tool 28 for operating the expander is merely representative and that the expander may be operated by any suitable mechanism for exerting the required pull. The tool 28, as shown, is provided with the screw-threaded socket 50 for receiving the end of the coupling 30. This coupling is held in position with reference to the tool 28 by a nut 52 which is in turn screw-threaded to receive the socket 50. The tool 28 may be a pneumatic air hammer or any other suitable motor operated mechanism for exerting the required pull on the expander.

It is also to be understood that the tube sheet 26 may be illustrative of a wall of a drum or header used in the construction of a heat exchanger wherein two drums are directly connected by a plurality of tubes. The method of forming tube seat connections described herein is particularly advantageous in the construction of such heat exchangers, inasmuch as it eliminates the undesirable effect of working the metal at the expanded locations so that there is an actual lengthening of the tubes between the drums or headers. The illustrative method avoids the residual stresses on the tubes and the tube seats imposed by such lengthening of the tubes.

The illustrative method involves the limiting of the initial expanding action to a position remote from a tube end and adjacent the outer surface of a tube sheet or drum wall, and subsequent expanding action in a direction toward the tube end. Thus, if there is any lengthening of the tube metal of the expanded portion, such dimension addition of the tube ends takes place away from the body of the tube.

When expanding tubes of a heat exchanger involving fixed drums, and in attempting to expand the tubes in a direction reverse to that involved in the illustrative method, there may be such elongations of the tubes that adjacent tubes and tube seats will be left in a state of high residual stress, or the tubes themselves may be actually bowed by the compression stresses imposed. Such effects can not take place when the illustrative method is employed.

The above described expander is particularly adapted to form a component part of the system indicated in Fig. 14 of the drawings and it is well adapted to be actuated by the fluid pressure operator indicated in Figs. 6–13, inclusive. This operator is illustrated as associated with a modified form of the expander head but it will be appreciated from the following description that it may be equally well applied to the expander which has been described.

The double acting cylinder 60 of the operator indicated in Figs. 6, 7, 10, and 11 encloses an outer piston 62 which has a close sliding fit with the inner wall of the cylinder. This piston is rigidly connected with the expander mandrel 64 upon which a sleeve 66 for an inner piston is telescopically mounted. The inner piston 68 has sliding movement within the outer piston and the sleeve likewise may have movement relative to the mandrel. The sleeve may thus be said to form a bearing for the mandrel and the combined sleeve and mandrel unit may slide within a stuffing box 70 and the packing 72 secured within one end of the cylinder.

The other end of the cylinder is closed by a cap 74 provided with a stuffing box 76 in which a hollow piston rod 78 for the main piston has sliding movement. A fluid pressure line 80 is connected to the hollow piston in order to provide for pulling the expander head out of the tube which is being expanded. During this action the fluid flows from the cylinder through a fluid pressure connection 82 which is arranged radially with respect to this cylinder and connected in that manner to the cap 74.

The parts of the expander head in the fluid pressure operator are shown in their starting positions in Fig. 6, the split expander rings 84 and 86 being disposed at the smaller end of the frusto-conical expander portion 88 of the mandrel. In this arrangement of the elements the expander head including the mandrel and the expander rings may be freely inserted within the tube to be expanded with the end of the tube abutting against a reaction shoulder 90 formed in the stuffing box 70 at the end of the cylinder 60.

The expander rings 84 and 86 are constructed of spring steel and the openings between their facing ends are offset as indicated in Figs. 6 and 7 of the drawings. It will also be noted in connection with this disclosure that the expansion of the rings is indicated by the increase in the size of the openings.

To initiate the expanding of the tube the control switch 92 (see Fig. 14) is operated to start the motor 94 and the pump 96 so as to force fluid through the inlet 98 at the end of the hollow piston rod 78. The fluid flows from this piston rod through radial ducts 100 and 102 and then through horizontal ducts 104 and 106 formed in the piston rod and communicating with a chamber 108 between the right-hand head of the main piston and the inner piston 68. The inner piston 68 can not move to the left on account of the presence of the pins 110—112 which are secured to the inner piston in such a way that they extend through openings in the left-hand head 114 of the outer piston and abut against the left-hand end of the cylinder 60. Therefore, the main piston 62 moves to the right and the parts are brought into the positions indicated in Fig. 7 of the drawings. During this action the tapered or frusto-conical portion 88 of the mandrel 64 is pulled through the expanding rings so that the adjustable stop 116 screw-threaded on the end of the mandrel contacts with the expander ring 84 and limits the expansion of both rings. This action causes the expansion of a portion of the tube near the inner face of the metallic wall 118 in which the tube seats are formed. This expansion is clearly indicated in Fig. 7 of the drawings at 121.

During this initial expanding operation the main piston 62 may be said to slide along the pins 110—112 fixed to the inner piston and this action continues until the parts reach the positions indicated in Fig. 7 wherein the left-hand head 114 of the outer piston contacts with the inner piston. At this time the longitudinal ducts 120 in the outer piston 62 (see Figs. 6, 7, and 8) are moved so that their inlet ends are brought into communication with the chamber 108 between the inner piston and the right-hand head of the outer piston. Thereupon, the fluid flowing from the pump 94 and through the hollow piston rod 78 flows into the chamber 122 which is clearly indicated at the left-hand side of the outer piston in Fig. 7 of the drawings.

Continued flow of the fluid through the longitudinal main piston ducts 120 into the chamber 122 causes both pistons, the mandrel, and the expander rings, to move as a unit, the pistons moving toward the right-hand end of the cylinder and the expander rings being pulled through the tube 124 to the end of the tube seat. The expanding operation is thus completed and the switch 92 controlling the inflow of fluid to the hollow piston rod 78 is opened stopping the flow of fluid in that direction.

After each expanding operation the entire cylinder and expander unit is moved from the tube and the other switch 130 then operated to allow fluid to flow through the cylinder and the pistons in the manner indicated in Fig. 11. The fluid under pressure then flows through the radial inlet 132 into the chamber 134 at the right of the main piston. This action forces the entire piston assembly to the left and the flow of fluid from the chamber 122 through the longitudinal main piston ducts 120 and through the hollow piston 78 is reversed as indicated by the arrows in Fig. 11. This movement continues until the outer (left-hand) ends of the pins 110—112 contact with the left-hand end wall of the cylinder. Then, the movement of the inner piston to the left is stopped and continued movement of the main piston to the left interrupts the communication between the ducts 120 and the chamber 108 between the two pistons so that continued movement of the main piston 62 to the left is permitted only when some means of egress for the fluid entrapped in the chamber 122 is provided. Such egress can take place through ducts 140 formed in the left-hand head 114 of the main piston. These ducts communicate with an annular chamber 142 formed in the left-hand face of the inner piston as indicated in Figs. 11 and 12 of the drawings. Fig. 12 shows one of these ducts above the inner piston pin 111 and communicating with a circular chamber 144 in which there is located a valve-closing spring 146 surrounding the stem 148 of the poppet valve 150 and confined between the inner piston and an annular locking member 152 on the valve stem. Each chamber 144 in which a valve spring is located communicates with an annular chamber 154 immediately at the base of the valve by means of ducts 156 which are parallel to the valve stem. The arrangement of these ducts is particularly indicated in Figs. 12 and 13 of the drawings.

With the elements arranged as above indicated, continued movement of the fluid against the main piston 62 in the direction of the arrows of Fig. 11 compresses the fluid within the chamber 122 and causes it to flow through the ducts 140, and 156 to open the poppet valves. The fluid then flows toward the hollow piston rod 78 of the main piston and thence into the closed fluid circuit, this movement continuing until the mandrel is moved to the left-hand limit of its path of operation and the various parts of the expander apparatus are brought to their starting positions which are indicated in Fig. 6 of the drawings. Thereupon, the expander head is moved to another tube to be expanded and the entire cycle of operations is repeated.

Fig. 14 indicates a system employing the above described expander apparatus, and operative to expand the tubes communicating with a pressure vessel such as a drum. The operator, within the drum, moves the double acting cylinder 60 so that the expander head is disposed in operative position in a tube end and closes the expanding switch 92. This action operates through a solenoid 160 to actuate the four-way valve 162 and start the motor 94 and pump 96 in such operation that the fluid flows through the pressure line 164 axially connected to the cylinder 60 and connected to the hollow piston 78. The pump creates enough pressure in this line to pull the expander head through that portion of the tube within the tube seat in the drum wall 166 and the pressure required to effect this operation may be measured by a pressure gage 168 in direct communication with the piston chamber of the expander cylinder and arranged so that it may be conveniently read by the operator. The pressures employed in the succeeding expanding operations may also be measured and recorded by a recording pressure gage 170 which is in communication with the line 164. This recording pressure gage affords a visual comparison of the pressures required to perform the successive expanding operations and when the pressure required is a measure of the tightness of the tube seat connections the operator may readily check the effectiveness of his work as it proceeds. In the event that he finds that the pressure required to expand a certain tube is less than that which is necessary to produce a pressure-tight connection, he may repeat the expanding operation of that tube after adjusting the stop 116 at the end of the mandrel 64 so that the expander rings will ride further up upon the tapered part of the mandrel.

The closing of the switch 130 to bring the expander head back to its starting position reverses the flow through the four-way switch 162 by the energizing of an opposed solenoid 172. This solenoid has as its armature or core the switch rod 174 connected by the link 176 with the stem 178. This solenoid is also in series with a circuit which starts the operation of the pump 94 forcing the fluid through the return line 180 to the radial inlet 132 of the expander cylinder and continues such flow until the parts of the expander are brought to their starting positions. Thereupon, the return switch 130 is opened.

The motor and pump unit is particularly designed to meet the requirements of hydraulic installations which call for a pump automatically providing high operating pressures as they are required in the work to be done. The assembly includes a low pressure pump and a high pressure pump directly connected to the shaft 186 of the driving motor 94, and above the pump there is a relief valve 188, a check valve 190, and a bypass valve 192 arranged from left to right in the order named. In Fig. 14 the inlet for both the high pressure and low pressure pumps is at the bottom and a pressure line 194 is indicated as extending from the valve assembly directly to the four-way valve 162 which controls the movement of the fluid in the lines connected with the expander.

The method effected by the described apparatus includes the employment of a fluid successively brought up to the pressure requirement for effecting separate and successive tube expanding operations on tubes in the same tube sheet or drum wall, involving the determination of minimum pressure necessary to produce a connection which will be pressure-tight under predetermined operating conditions, the measuring of the fluid pressures for the successive expanding operations, adjusting of the expanding conditions of any one of such operations for which the fluid pressures indicated are below said minimum, and reexpanding the pertinent tube under said adjusted conditions to bring the fluid pressure for its expanding up to said minimum.

Although the invention has been illustrated and described with reference to tubes of circular cross section, the system and the apparatus involved may, by relatively minor alterations, be advantageously used to expand tubes which are not circular in cross section. This result cannot be secured with the rotary types of expanders of the prior art.

Whereas, the invention has been described with reference to certain particular embodiments indicated in the accompanying drawings, it is to be appreciated that the invention is not limited to all of the details thereof. The invention is rather to be taken as of a scope commensurate with the scope of the subjoined claims.

This application is a division of my co-pending application, Serial No. 274,749, filed May 20, 1939 (now Patent 2,275,451, dated March 10, 1942).

What is claimed is:

1. In apparatus for expanding and drawing portions of tubes fitted within tube seats formed in a metallic wall; an expander head adapted to be freely inserted in a tube and including a mandrel, a sleeve mounted on the mandrel so that there may be relative movement between the sleeve and the mandrel, the mandrel having near one end a tapered portion tapering upwardly toward that end, and a split ring slidably mounted upon the mandrel about its tapered portion and arranged to be temporarily held by said sleeve against movement longitudinally of the tube; means reacting against a fixed element to cause relative movement between the ring and said tapered mandrel portion so that the tube is expanded, said means also subsequently pulling the expanded ring through a portion of the tube while the ring and the mandrel are maintained in fixed tube expanding relationship; and an adjustable stop on the mandrel for determining the extent to which the ring is expanded by the relative motion of the sleeve and the tapered portion of the mandrel, said means being operatively connected to the mandrel opposite the end having said tapered portion.

2. In a pull type tube expanding and drawing tool for effecting pressure tight connections between tubes and a wall presenting tube seats in which the tubes are fitted, an expander head contractible to a tube entering condition and including tube engaging components, a mandrel embraced by said components, the mandrel having a head expanding tapered portion effective upon the head components when the mandrel has longitudinal movement relative to the expander head, pulling means coupled to the mandrel and acting to pull the expanded head along a tube and toward its adjacent end, and expander head holding means operatively associated with the expander head and the pulling means and holding the tube enclosed expander head against movement with the mandrel until the former has expanded the tube.

3. In a tube expander of the pull type, a combined segmental expander head and unitary sleeve adapted to be freely inserted within a tube in contracted condition, a mandrel extending through said expander head and sleeve and having its operating end extending from the adjacent end of the tube, the mandrel also having a portion tapering downwardly toward said operating end of the mandrel and toward the adjacent end of the tube in which the expander head is inserted, said tapered portion of the mandrel having a length greater than the thickness of said head longitudinally of the mandrel, means including said sleeve for temporarily holding the expander head against movement with the mandrel during a part of the movement of the latter outwardly of the tube, the sleeve being thereafter movable with the mandrel, and a stop against which the expander head abuts in order to determine the amount of expansion of the tube and to transmit the force by which the combined expanded sleeve and head is withdrawn from the tube, the stop being secured to the mandrel adjacent the larger end of the tapered portion of the mandrel and extending radially therefrom to have a path of movement in which the expander head is disposed, the tapering portion being disposed intermediate the stop and the operating end of the mandrel.

4. In a tube expander of the pull type, a mandrel having a tapered portion progressively decreasing in diameter toward the operating end of the mandrel which normally extends beyond a tube to be expanded, an annular expander head structure mounted on the mandrel and adapted to expand an enclosing tube when the tapered mandrel portion is moved longitudinally relative thereto, the contracted expander head being freely insertible in the end of a tube to be expanded, means temporarily holding the expander head within the tube and against movement with the mandrel during a part of the movement of the latter outwardly of the tube to cause its tapered portion to expand the head, at least a part of said means being movable conjointly with the mandrel subsequent to said holding action, and a stop secured to the mandrel adjacent the larger end of the tapered portion so as to determine the degree of expansion of the tube and transmit translational movement of the mandrel to said structure to expand a portion of the tube, said tapered portion being disposed at a position between said operating end of the mandrel and said stop, said stop extending radially from the mandrel into a path of movement in which said annular structure is disposed.

5. In a tube expander of the pull type, an expander head having expansible split rings adapted to be freely insertible within a tube when in contracted condition, a mandrel extending through said rings and having a coupling component near its outer end, the mandrel also having a portion tapering downwardly toward the end of the tube in which the expander head is inserted, the tapered portion being disposed within said rings and having a length greater than the combined thickness of said rings, an adjustable stop against which one of said rings abuts in order to determine the amount of tube expansion and to transmit the force by which the expanded rings are withdrawn from the tube, the stop being disposed adjacent the larger end of said tapered portion, and means holding the expander head rings against movement with the mandrel during a part of the movement of the latter outwardly of the tube, at least a part of said last named means being movable conjointly with the mandrel subsequent to said welding action, the tapered portion of the mandrel being intermediate the stop and said coupling component.

6. In a tube drawing and expanding device of the pull type, a mandrel having a conical tapered portion progressively decreasing in diameter toward the mandrel end by which the expander is adapted to be pulled out of a tube, an expander head including expansible spring elements mounted on the mandrel and adapted to expand an enclosing tube when the tapered mandrel portion is moved relative thereto, the contracted expander head being adapted to be freely moved into a tube to be expanded, means holding the spring elements against movement with the mandrel during a part of its tube expanding movement outwardly of the tube, at least a part of said last named means being movable conjointly with the mandrel during its movement subsequent to said holding action, and an adjustable stop secured to the mandrel adjacent the larger end of the tapered portion so as to determine the degree of tube expansion and to transmit translational movement of the mandrel to the expander head, said stop member being movable relative to the tapered portion to render a selected part of said tapered portion inoperative to expand said spring elements.

CARL A. MAXWELL.